June 2, 1942. R. J. RAYMOND 2,284,847
PHOTOGRAPHIC FILTER AND LIKE MOUNT
Filed Feb. 24, 1941

Robert John Raymond
By his attorney
Orville N. Greene

Patented June 2, 1942

2,284,847

UNITED STATES PATENT OFFICE 2,284,847

PHOTOGRAPHIC FILTER AND LIKE MOUNT

Robert John Raymond, Bulmer, England

Application February 24, 1941, Serial No. 380,223
In Great Britain April 3, 1940

6 Claims. (Cl. 88—113)

In photographic practice it is requently necessary to use supplementary lenses, filters, lens hoods, etc., which are attached temporarily to the lens mount and in the case of twin lens cameras to both lens mounts simultaneously. These lens mounts are usually of such a form that the part to be fitted thereto can readily be detached when not required, and the detachable part is usually either a push fit on to the lens mount of the camera or is frictionally attached thereto by spring means. Both these attachment means are unsatisfactory as the supplementary lens or filter is liable to be knocked off and is generally either too tight or too loose a fit on to the camera lens mount.

The present invention seeks to overcome these difficulties and to provide a simple mount to which the filter, supplementary lens or the like may rigidly be fitted. The invention further allows for more than one attachment to be fitted to the camera, as it may be desirable to use a combination of attachments, for example a supplementary lens, filter and lens hood.

According to the present invention, a mount for a filter, supplementary lens, diffusion or polarising screen, lens hood or the like is adapted to be removably connected with the lens mount of a photographic apparatus by forming the two parts to be connected with complementary internal and external wedge-members arranged about a centre so that when the wedge-members of one part are positioned around those of the other part, the two parts can be secured together by being relatively partially rotated to cause a wedging action in a radial direction. The part to which the mount for the supplementary lens, filter, lens hood, or the like, is removably connected, may itself be secured to the lens mount on the photographic apparatus, or it may comprise a permanent part of the apparatus.

By forming each supplementary attachment with an external wedge formation at one side and with an internal wedge formation at the opposite side, any number of supplementary attachments can be secured to one another and to the lens mount on the photographic apparatus. The wedge members may take the form of teeth, say three in number, which are analogous to the teeth on a rotary saw, the longer edges of the teeth curving from tip to root. The edges of the wedge-members may be bevelled so that the relative partial rotation of the respective parts will cause them to lock in an axial direction as well as cause them to wedge together radially. Moreover, such bevelling ensures that the attachments will be affixed parallel with the plane of the objective.

Figure 1:
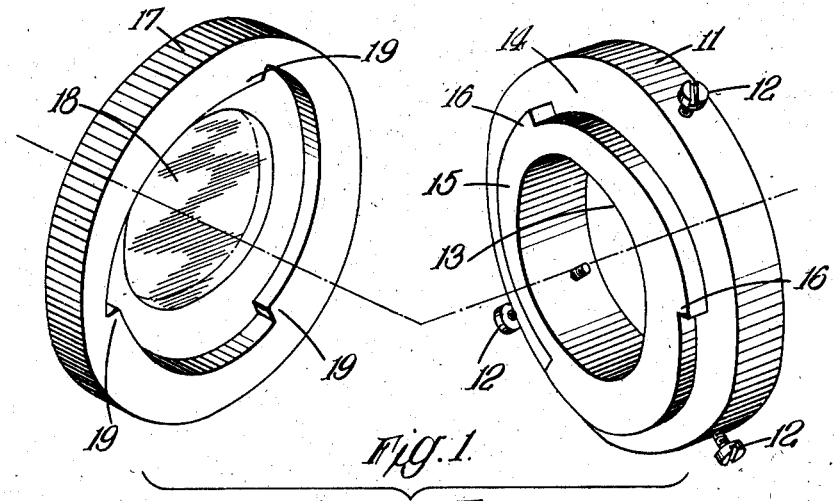
Figure 1 is a perspective view showing the adjacent faces of two complementary attachments or parts adapted to be removably secured together in accordance with the invention.
Figure 2:
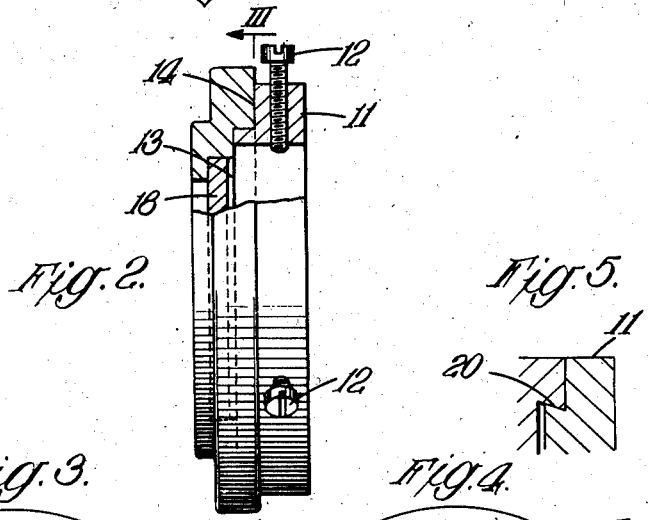
Figure 2 is a side elevation partly in section showing the two parts placed together.
Figure 3:
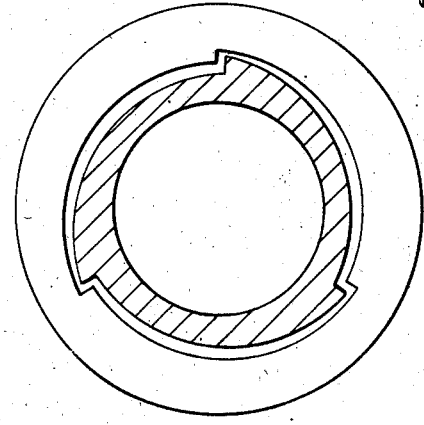
Figure 3 is a sectional end view on the line III—III of Figure 2 showing the relative positions of the wedge members of the two parts when first placed together.
Figure 4:
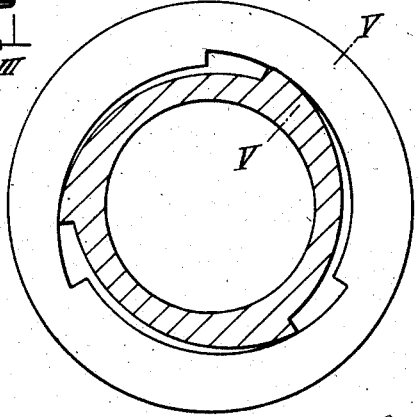
Figure 4 is a view similar to Figure 3 showing the two parts held after relative partial rotation.

As shown, an annulus 11 is adapted to be secured around a lens mount on a photographic apparatus by means of three clamping screws 12, the lens mount entering into the opening 13. The outer face 14 of the annulus 11 is formed with a series of internal wedge-members 15 arranged about the axis of the annulus. The wedge-members 15 comprise three teeth 16 which are analogous to the teeth of a circular saw, the longer edges of the teeth curving from tip to root eccentrically of the annulus. The supplementary attachment 17, which may carry a lens or filter 18 secured thereto in any convenient manner, as by means of optical cement, is recessed at one face to form a series of external wedge-members comprising three teeth 19. The general form of the teeth 19 are complementary with those of the teeth 16, but the pitch circle of the teeth 19 is greater than the pitch circle of the teeth 16. Also, the thickness of the teeth 19 is preferably slightly greater than that of the teeth 16. The annulus 11 and the attachment 17 are removably secured together by entering the wedge-members 16 into the recess within the wedge-members 19 and by partially rotating one member relatively to the other, the teeth 16 and 19 thus becoming wedged radially, see Figures 3 and 4. The attachment 17 has, at the opposite side to that shown in Figure 1, a series of internal teeth similar to the teeth 16 of the annulus 11, so that a further similar attachment can be secured to the attachment 17.

Figure 5:
Figure 5 is a fragmentary sectional elevation on the line V—V of Figure 4.

The edges of the wedge-members or teeth may be undercut or bevelled, as shown at 20 in Figure 5, with the result that the partial rotation of the two parts to bind them together radially, will also lock them parallel with one another against axial separation.

In the example illustrated, the first set of wedge-members, 16, are shown on an annulus adapted to be secured around the lens mount of the photographic apparatus. However, it is to be understood that the wedge-members may be formed on a permanent part of the apparatus, for example on the lens mount itself.

The attachments and annulus can be produced very economically by moulding from a plastic material, they can readily be secured and detached in a reliable manner, and different combinations of attachments can be mounted at will in position in front of the lens mount.

I claim:

1. A mount of the kind described, comprising an inner member formed on its exterior with a plurality of involute-shaped wedge-surfaces, and a second member having correspondingly shaped wedge-surfaces upon its interior, the second member being arranged to fit over the first member with clearance, the edges of the wedge-surfaces being bevelled so that relative partial rotation between two parts locks the parts together parallel with one another against axial separation.

2. A mount of the kind described comprising an annular member, formed with a shallow recess which is bounded by an undercut wall having a shape defined by a plurality of substantially involute "arcs" connected together by substantially radial "steps", and a second member having a correspondingly shaped projection adapted to fit loosely within the recess when the "step" portions are disposed in register, the outer surfaces of the projection being also undercut so that when the two members are engaged and turned relatively about their common axis, they become securely fastened together in co-axial relationship, the undercut surfaces acting to prevent separation of said members in an axial direction.

3. A mount according to claim 2, wherein the members are formed with mating shoulders which engage with one another to hold the members truly co-axial.

4. A mount according to claim 2, wherein the undercut surfaces are Z-shaped in cross section so that the relative turning movement draws the two members into full axial engagement.

5. A mount of the kind described, comprising an inner annular member formed externally with a circumferentially series of outwardly facing, substantially involute wedge surfaces, and with substantially radial steps between adjacent wedge surfaces, an outer annular member, and a circumferential series of inwardly facing substantially involute wedge surfaces and radial steps formed internally thereof, which wedge surfaces are adapted to mate with those of the inner annular member, whereby the annular members when inserted one within the other in an axial direction are brought into frictional gripping engagement by relative rotation, the disposition of the wedge surfaces serving to hold the annular members in true axial alignment.

6. A mount of the kind described, for uniting a pair of optical elements, said mounting comprising an inner annular member formed externally with a circumferential series of outwardly facing, substantially involute wedge surfaces, and with substantially radial steps between adjacent wedge surfaces, an outer annular member, a circumferential series of inwardly facing substantially involute wedge surfaces and radial steps formed internally thereof, which wedge surfaces are adapted to mate with those of the inner annular member, and means for securing the annular members to the optical elements to be united, whereby the annular members, when inserted one within the other in an axial direction are brought into centralized frictional gripping engagement by rotating said optical elements one relative to the other.

ROBERT JOHN RAYMOND.